United States Patent
Seok et al.

(10) Patent No.: US 11,690,107 B2
(45) Date of Patent: Jun. 27, 2023

(54) SYNCHRONOUS MULTI-LINK WIRELESS TXOP PROCEDURE

(71) Applicant: MediaTek Singapore Pte. Ltd., Singapore (SG)

(72) Inventors: Yongho Seok, San Jose, CA (US); Weisung Tsao, San Jose, CA (US); James Chih-Shi Yee, San Jose, CA (US); Po-Yuen Cheng, San Jose, CA (US)

(73) Assignee: MEDIATEK SINGAPORE PTE. LTD, Singapore (SG)

(*) Notice: Subject to any disclaimer, the term of this patent is extended or adjusted under 35 U.S.C. 154(b) by 62 days.

(21) Appl. No.: 17/219,646

(22) Filed: Mar. 31, 2021

(65) Prior Publication Data

US 2021/0315025 A1 Oct. 7, 2021

Related U.S. Application Data

(60) Provisional application No. 63/051,416, filed on Jul. 14, 2020, provisional application No. 63/033,241, (Continued)

(51) Int. Cl.
*H04W 74/08* (2009.01)
*H04L 1/00* (2006.01)
*H04W 56/00* (2009.01)

(52) U.S. Cl.
CPC ....... *H04W 74/0891* (2013.01); *H04L 1/0008* (2013.01); *H04W 56/001* (2013.01); *H04W 74/0816* (2013.01)

(58) Field of Classification Search
CPC ........... H04W 56/001; H04W 56/0015; H04W 74/0891; H04W 74/0816; H04W 74/08; (Continued)

(56) References Cited

U.S. PATENT DOCUMENTS 10,939,476 B1 * 3/2021 Chu .................. H04W 76/18
11,265,927 B1 * 3/2022 Chu .................. H04W 74/085
(Continued)

FOREIGN PATENT DOCUMENTS

| EP | 3764727 A1 | | 1/2021 |
| GB | 2549967 A | | 8/2017 |
| WO | WO2021003700 | * | 1/2021 |

OTHER PUBLICATIONS

IEEE—Song Jan. 2020.*
(Continued)

*Primary Examiner* — Sudesh M Patidar

(57) ABSTRACT

Embodiments of the present invention are drawn to a computer-implemented process for automatically synchronizing TXOPs for a multi-link device (MLD) to improve wireless network performance and prevent IDC. The novel process can be performed by a multi-link device performing a multi-link operation, and the multi-link device can act as a wireless access point or a wireless station. Independent EDCA channel access can be performed at the multi-link device on a first wireless link and a second wireless link, and a back-off counter for a first wireless STA and a back-off counter for a second wireless STA are set according to the independent EDCA channel access. A TXOP is synchronously obtained on the first wireless link and the second wireless link responsive to the back-off counters expiring, and a multi-link operation is performed at the MLD using the first wireless link and the second wireless link during the TXOP.

13 Claims, 16 Drawing Sheets

Related U.S. Application Data filed on Jun. 2, 2020, provisional application No. 63/005,493, filed on Apr. 6, 2020.

(58) Field of Classification Search
CPC . H04W 74/0808; H04W 76/15; H04W 28/06; H04L 1/0008; H04B 1/1027; H04B 2001/1045

See application file for complete search history.

(56) References Cited

U.S. PATENT DOCUMENTS

| | | | |
|---|---|---|---|
| 2016/0157200 A1* | 6/2016 | Jin | H04W 56/0065 370/350 |
| 2016/0360443 A1* | 12/2016 | Hedayat | H04W 74/006 |
| 2017/0338935 A1* | 11/2017 | Ahn | H04W 72/0446 |
| 2019/0007973 A1* | 1/2019 | Lou | H04W 74/0816 |
| 2020/0187231 A1* | 6/2020 | Oteri | H04W 72/1268 |

OTHER PUBLICATIONS

Yunbo Li; et al. Channel Access in Multi-band operation. Jul. 2, 2019; doc.: IEEE 802.11-19/1116r0. 16 pp.

Insun Jang; et al. Channel Access for Multi-link Operation. Jul. 15, 2019. doc.: IEEE 802.11-19/1144r6. 14 pp.

Yonggang Fang; et al. Multi-link Channgel Access Discussion. Mar. 16, 2020. doc.: IEEE 802.11-2020/0469. 10 pp.

* cited by examiner

SYNCHRONOUS MULTI-LINK WIRELESS TXOP PROCEDURE

CROSS-REFERENCE TO RELATED APPLICATIONS

This application claims the benefit of and priority to provisional patent application Ser. No. 63/005,493, with filing date 2020 Apr. 6; provisional patent application Ser. No. 63/033,241, with filing date 2020 Jun. 2; and provisional patent application Ser. No. 63/051,416, with filing date 2020 Jul. 14, which are each hereby incorporated by reference in their entirety.

FIELD

Embodiments of the present invention generally relate to the field of wireless communications. More specifically, embodiments of the present invention relate to systems and methods for wirelessly transmitting data from a multi-link device.

BACKGROUND

Modern electronic devices typically send and receive data with other electronic devices wirelessly using Wi-Fi, and many of these electronic devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

In some cases, the use of a single band may not satisfy the bandwidth needs of certain devices. Therefore, some developing approaches to wireless communication increase communication bandwidth by operating on multiple bands concurrently (technically called link aggregation or multi-link operation). Multi-link operations can provide higher network throughput and improved network flexibility compared to traditional techniques for wireless communication.

When a multi-link device (MLD) operating over multiple links has data ready for transmission (queued), the MLD must determine on which link or links to transmit the queued data frame Using existing techniques (e.g., Asynchronous TXOP), each STA in the multi-link device performs an independent Enhanced Distributed Channel Access (EDCA) mechanism on each link with its own EDCA parameters (e.g., CWmin, CWmax, AIFS, CW, and Retry Counter). When the back-off procedure of each STA is invoked, the back-off counter of each STA is set to an integer value selected randomly. After obtaining a transmission opportunity (TXOP), the STA may initiate a transmission of a frame exchange sequence over the respective link or links. However, when STAs of a multi-link device simultaneously transmit and receive physical layer protocol data units (PPDUs) on multiple links, in-device coexistence (IDC) interference between the wireless links can cause errors in the reception and can also reduce performance of the MLD. However, the IDC interference caused by simultaneous transmission and reception using a 5 GHz band and a 6 GHz band can be especially significant depending the frequency separation of the operating channels. Therefore, some MLDs are not capable of simultaneous transmission and reception due to IDC interference.

Accordingly, a technique for synchronizing transmission opportunities of an MLD is sought to increase performance and reliability of wireless transmissions while preventing or reducing IDC interference caused by simultaneous transmission and reception by the MLD.

SUMMARY

Accordingly, embodiments of the present invention are drawn to a computer-implemented process for automatically synchronizing TXOPs for a multi-link device (MLD) to improve wireless network performance and prevent IDC interference, which is depicted according to embodiments of the present invention. The process can be performed by a multi-link device performing a multi-link operation, and the multi-link device can act as a wireless access point or a wireless station. The MLD includes a first wireless station (STA) associated with a first wireless link and a second wireless STA associated with a second wireless link. The MLD can include more wireless STAs for communicating over different wireless links.

According to one embodiment, a method of transmitting data over a wireless network by a multi-link device (MLD) is disclosed. The method includes performing independent EDCA channel access at the multi-link device on a first wireless link and a second wireless link. The multi-link device includes a first wireless station (STA) associated with the first wireless link, and a second wireless STA associated with the second wireless link. The method further includes setting a back-off counter for the first wireless STA and a back-off counter for the second wireless STA according to the independent EDCA channel access, obtaining a TXOP synchronously on the first wireless link and the second wireless link responsive to the back-off counters expiring, and performing a multi-link operation at the MLD using the first wireless link and the second wireless link during the TXOP.

According to some embodiments, the method includes receiving timing accuracy information from a second MLD indicating that the second MLD can respond within a period of time equal to aSIFSTime+aSignalExtension±TimingErrorMargin measured from the end of a transmission of a soliciting frame, where the MLD performs the multi-link operation in coordination with said second MLD.

According to some embodiments, the multi-link operation includes transmitting a first MU-RTS frame using the first wireless STA over the first wireless link, and transmitting a second MU-RTS frame using the second wireless STA over the second wireless link.

According to some embodiments, the first MU-RTS includes padding that aligns an ending time of the first MU-RTS with an ending time of the second MU-RTS frame.

According to some embodiments, the first MU-RTS includes padding that aligns reception of a first CTS frame with reception of a second CTS frame, where the first CTS frame and the second CTS frame are transmitted responsive to the first MU-RTS frame and second MU-RTS frame, respectively.

According to some embodiments, the padding field aligns a TXOP of the first wireless link with a TXOP of the second wireless link.

According to some embodiments, the method includes configuring a slot alignment of the first wireless STA to match a slot alignment of the second wireless STA.

According to some embodiments, the method includes determining that a back-off counter of the first wireless link has expired, delaying a frame exchange sequence over the first wireless link until a back-off counter of the second wireless link has expired, determining that the back-off counter of the second wireless link has expired, and responsive to determining that the back-off counter of the second wireless link has expired initiating the frame exchange sequence over the first wireless link during the TXOP, and initiating a frame exchange sequence over the second wireless link during the TXOP.

According to some embodiments, the method includes performing carrier sensing before the first wireless STA initiates a frame exchange sequence.

According to some embodiments, the back-off timer of the first wireless link and the back-off timer of the second wireless link are set using a common integer value.

According to another embodiment, an apparatus for transmitting data over a wireless network is disclosed. The apparatus includes a first wireless station (STA) associated with a first wireless link of the wireless network, and a second wireless STA associated with a second wireless link of the wireless network, a memory for storing data, and a processor operable to: perform independent EDCA channel access on the first wireless link and the second wireless link, where the multi-link device includes: set a back-off counter for the first wireless STA and a back-off counter for the second wireless STA according to the independent EDCA channel access, obtain a TXOP synchronously on the first wireless link and the second wireless link responsive to the back-off counters expiring, and perform a multi-link operation using first wireless STA over the first wireless link and the second wireless STA over the second wireless link during the TXOP.

According to some embodiments, the method includes receiving timing accuracy information from a second MLD indicating that the second MLD can respond within a period of time equal to aSIFSTime+aSignalExtension±TimingErrorMargin measured from the end of a transmission of a soliciting frame, where the MLD performs the multi-link operation in coordination with said second MLD.

According to some embodiments, the multi-link operation includes transmitting a first MU-RTS frame over the first wireless link, and transmitting a second MU-RTS frame over the second wireless link.

According to some embodiments, the first MU-RTS includes padding that aligns an ending time of the first MU-RTS with an ending time of the second MU-RTS frame.

According to some embodiments, the first MU-RTS includes a padding field set according to an expected channel access latency of the second wireless STA.

According to some embodiments, the method includes determining that a back-off counter of the first wireless link has expired, delaying a frame exchange sequence over the first wireless link until a back-off counter of the second wireless link has expired, determining that the back-off counter of the second wireless link has expired, and responsive to determining that the back-off counter of the second wireless link has expired initiating the frame exchange sequence over the first wireless link during the TXOP and initiating a frame exchange sequence over the second wireless link during the TXOP.

According to some embodiments, the back-off timer of the first wireless link and the back-off timer of the second wireless link are set using a common integer value.

According to a different embodiment, a method of transmitting data over a wireless network by a multi-link device (MLD) is disclosed. The method includes performing independent EDCA channel access at the multi-link device on a first wireless link and on a second wireless link. The multi-link device comprises a first wireless station (STA) associated with the first wireless link, and a second wireless STA associated with the second wireless link. The method further includes transmitting a first MU-RTS frame using the first wireless STA over the first wireless link, transmitting a second MU-RTS frame using the second wireless STA over the second wireless link, wherein the second MU-RTS comprises padding that aligns reception of CTS frames received in response to the first MU-RTS frame and the second MU-RTS frame, obtaining a TXOP synchronously on the first wireless link and on the second wireless link, and performing a multi-link operation at the multi-link device using the first wireless link and the second wireless link during the TXOP.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
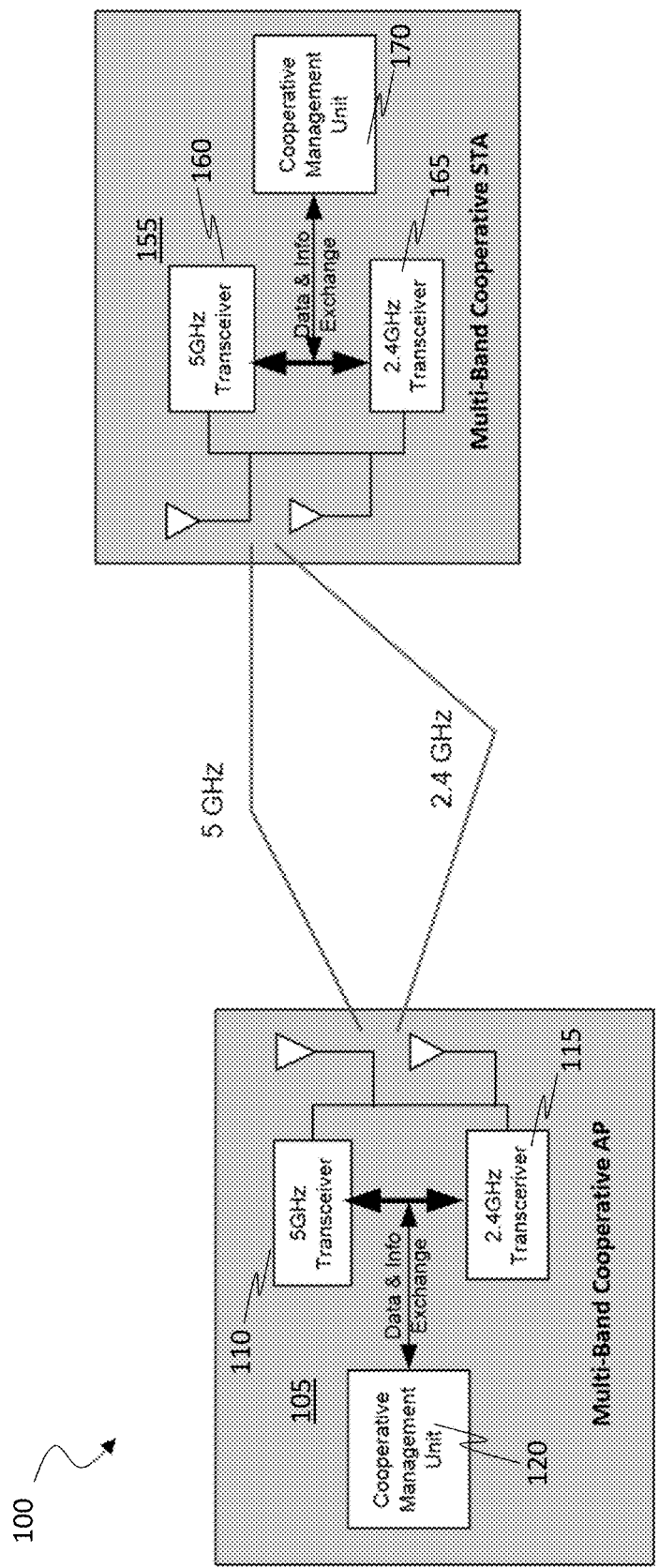
FIG. 1 depicts an exemplary wireless communication system including a multi-link cooperative AP and a multi-link cooperative STA is depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 15) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Synchronous Multi-Link Wireless TXOP Procedure

As used herein, the term "EHT" refers generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi. Some wireless STAs can be configured to serve as a wireless access point (AP).

Multi-link operations can provide higher network throughput and improved network flexibility compared to traditional techniques for wireless communication. Embodiments of the present invention provide techniques for simultaneously transmitting frames over multiple links in a multi-link operation between wireless devices using a synchronized TXOP. According to some embodiments, slot boundaries of the multiple links are brought into alignment so that a TXOP can be obtained over the multiple links.

With regard to FIG. 1, an exemplary wireless communication system 100 including a multi-link cooperative AP 105 and a multi-link cooperative STA 155 is depicted according to embodiments of the present invention. The multi-link cooperative AP 105 includes a 5 GHz transceiver 110 and a 2.4 GHz transceiver 115. Other types of transceivers that operate on different bands, such as 6 GHz and above, can also be used by the multi-link cooperative AP 105 according to embodiments of the present invention. The transceivers 110 and 115 of AP 105 exchange data and information with cooperative management unit 120 that coordinates information sent and/or received by transceivers 110 and 115. Each transceiver of multi-link cooperative AP 105 can be considered a separate wireless station affiliate with multi-link cooperative AP 105.

Multi-link cooperative STA 155 includes a 5 GHz transceiver 160 and a 2.4 GHz transceiver 165. Other types of transceivers that operate on different bands, such as 6 GHz and above, can also be used by the multi-link cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively, although any well-known wireless communication band (e.g., 6 GHz) can be used. Each transceiver of multi-link cooperative STA 155 can be considered a separate wireless station affiliate with multi-link cooperative STA 155.

STA 155 transmitting frames using multiple bands simultaneously can mitigate delay and improve peak throughput of STA 155. However, in some cases, transmitting frames using multiple bands simultaneously can degrade the performance of the basic service set (BSS) comprising STA 155. For example, the performance of the BSS can be degraded when STA 155 operating on multiple bands simultaneously uses a substantial amount of the bandwidth available to the BSS due to the increased traffic. Therefore, the AP 105 can control which STAs are granted multi-link channel access, and the access can be terminated by the AP at any time, for example, based on changing network conditions or requirements.

Depending on certain conditions, such as traffic load, a non-AP STA may use fewer than all supported/available links in order to reduce energy consumption. Moreover, a non-AP STA may apply an independent power management for each link, and the AP can provide the TID-to-link mapping information for each link. Depending the Quality of Service (QoS) policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide the TID-to-link mapping information for both links to the wireless STA, where some data can only be sent on the first link, and other data can only be sent on the second link.

Data transmitted over a first wireless link, such as the 5 GHz wireless link provided by 5 GHz transceiver 110 or 160, can be retransmitted over a different wireless link. For example, if a data transmission over the 5 GHz wireless link is sent unsuccessfully (e.g., no acknowledgment received), the data can be retransmitted over the 2.4 GHz wireless link provided by 2.4 GHz transceiver 115/165. The data transmission (e.g., a PPDU) can be originally encoded for transmission on a first wireless link (e.g., a 2.4 GHz or 5 GHz wireless link), and the retransmitted data can be prepared for transmission according to embodiments of the present invention described herein for encrypting data for retransmission in a multi-link environment.

Figure 2:
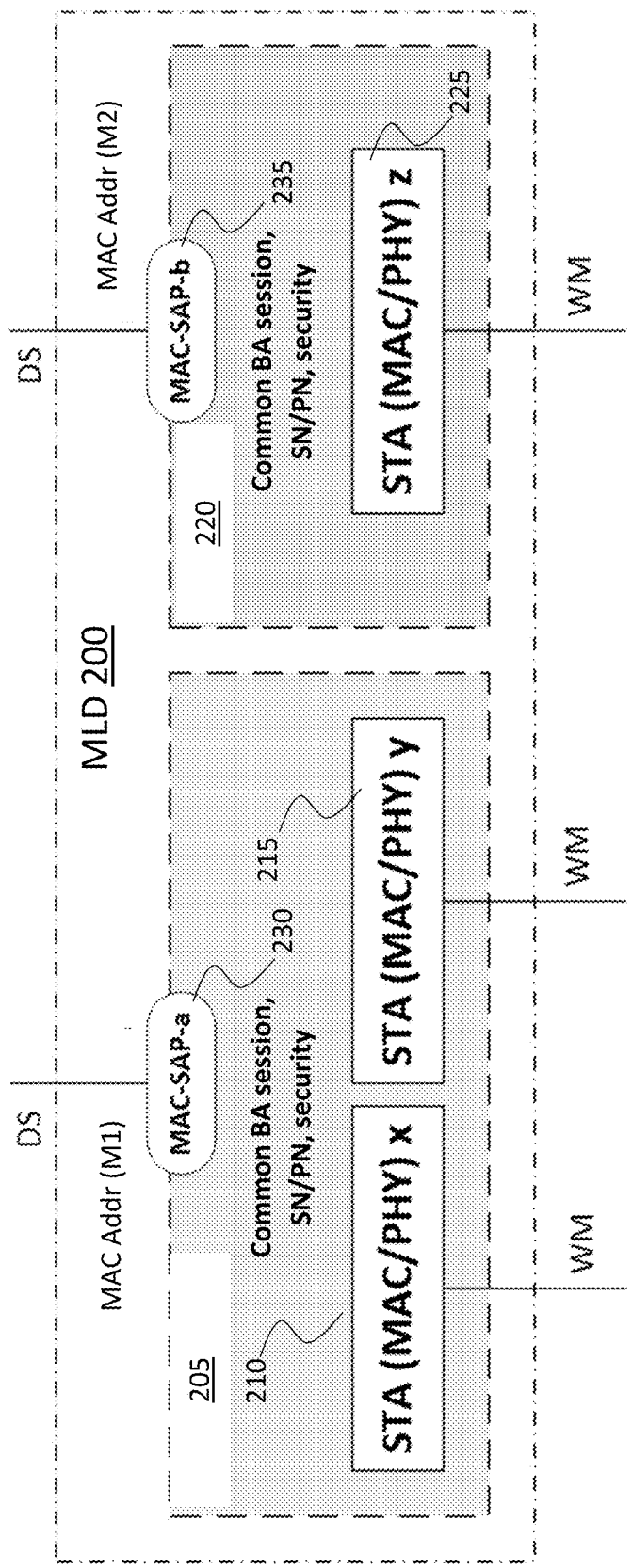
FIG. 2 is a block diagram depicting an exemplary MLD (e.g., a wireless AP capable of operating over multiple links) including more than one affiliated STA and a MAC SAP to LLC including a MAC data service.

FIG. 2 is a block diagram depicting an exemplary MLD 200 (e.g., a wireless AP capable of operating over multiple links) including more than one affiliated STA according to embodiments of the present invention. MLD entity 205 accesses a wireless medium (WM) using STA instance 210 and/or STA instance 215. MLD entity 220 includes STA instance 225 for accessing a wireless medium. The MAC SAPs receive data from a distribution system (DS) for transmission over the wireless medium. STA instances 210, 215, 225 can be used to perform multi-link operations, such as synchronous multi-link transmission. It is appreciated that STAs affiliated with an MLD can operate independently and follow baseline Enhanced Distributed Channel Access (EDCA) mechanism for accessing a channel.

The wireless STA 200 can perform common management signaling across MLD entity 205 and MLD entity 220. During a multi-link operation, wireless STA 200 can be viewed as a single device. The STA 205, 210, and 225 use the WM media access control (MAC) address to identify themselves to peer devices. Wireless STA 200 includes MAC services access points (SAPs) interfaces 230 (MAC Addr M1) and 235 (MAC Addr M2) that can receive plaintext MPDUs for transmission over wireless the WM using different links. For example, different MAC layer address can be associated with each wireless link accessed by wireless STA 200. The address of MAC SAP 230 of MLD entity 205 and MAC SAP 235 of MLD entity 220 can be used for key generation, SA setup, and encryption of data for retransmission to retransmit an encrypted MPDU over a wireless link.

Figure 3:
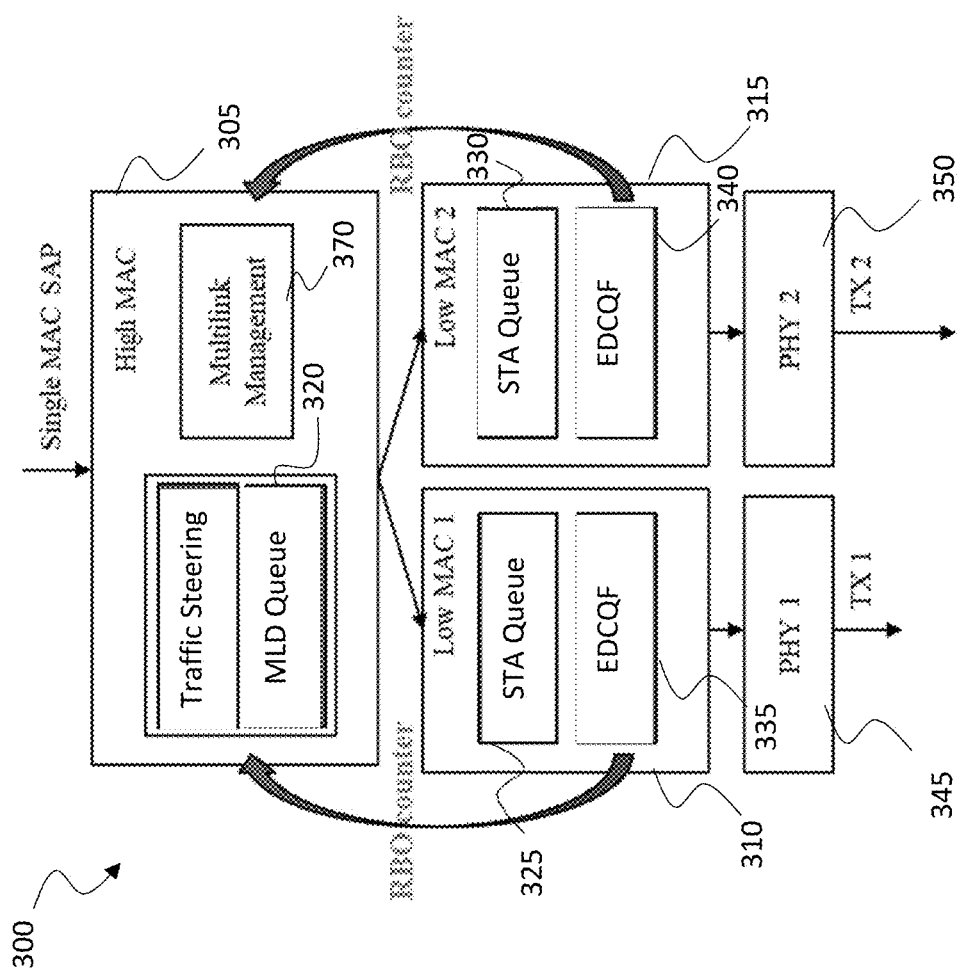
FIG. 3 is a block diagram of an exemplary MAC layer protocol of an MLD including an upper MAC layer protocol and lower MAC layer protocols depicted according to embodiments of the present invention.

With regard to FIG. 3, an exemplary MAC layer protocol 300 of an MLD including an upper MAC layer protocol 305 and lower MAC layer protocols 310 and 315 depicted according to embodiments of the present invention. Synchronous TXOP for transmission from MLDs can be implemented without changes to the lower MAC layer protocol 305 and without changes to existing back-off procedures (e.g., the baseline EDCA procedure). To implement synchronous TXOP for a MLD, MPDUs from MLD queue 320 are moved to a selected STA queue according to the random back-off (RBO) counter of the affiliated STAs. Before a transmitter of the STAs of an MLD is selected for transmission, the MLD buffers the frame (e.g., an MPDU) using MLD queue 320 of upper MAC layer protocol 305. After a transmitter of the STAs affiliated to a MLD is selected, the MLD buffers the MPDUs in the STA queue associated with the transmitter (e.g., STA queue 325 or STA queue 330). As discussed in more detail below with regard to FIG. 4, the STA queues 325 and 330 can include transmit queues for queuing frames of different access categories (ACs).

The MLD includes a multilink management/scheduler 370 for scheduling frame transmissions during a TXOP. As depicted in FIG. 3, the multilink management/scheduler 370 of high MAC layer protocol 305 receives RBO counters from the Enhanced Distributed Channel Access Functions (EDCAFs) 335 and 340 of lower MAC layer protocols 310 and 315, respectively, and schedules frames for transmission using STA queue 325 and STA queue 330. According to the scheduling of multilink management/scheduler 370, frames are queued for transmission in STA queue 325 or STA queue 330 and passed to PHY layer protocol 345 or PHY layer protocol 350, respectively, for transmission over a wireless medium.

Figure 4:
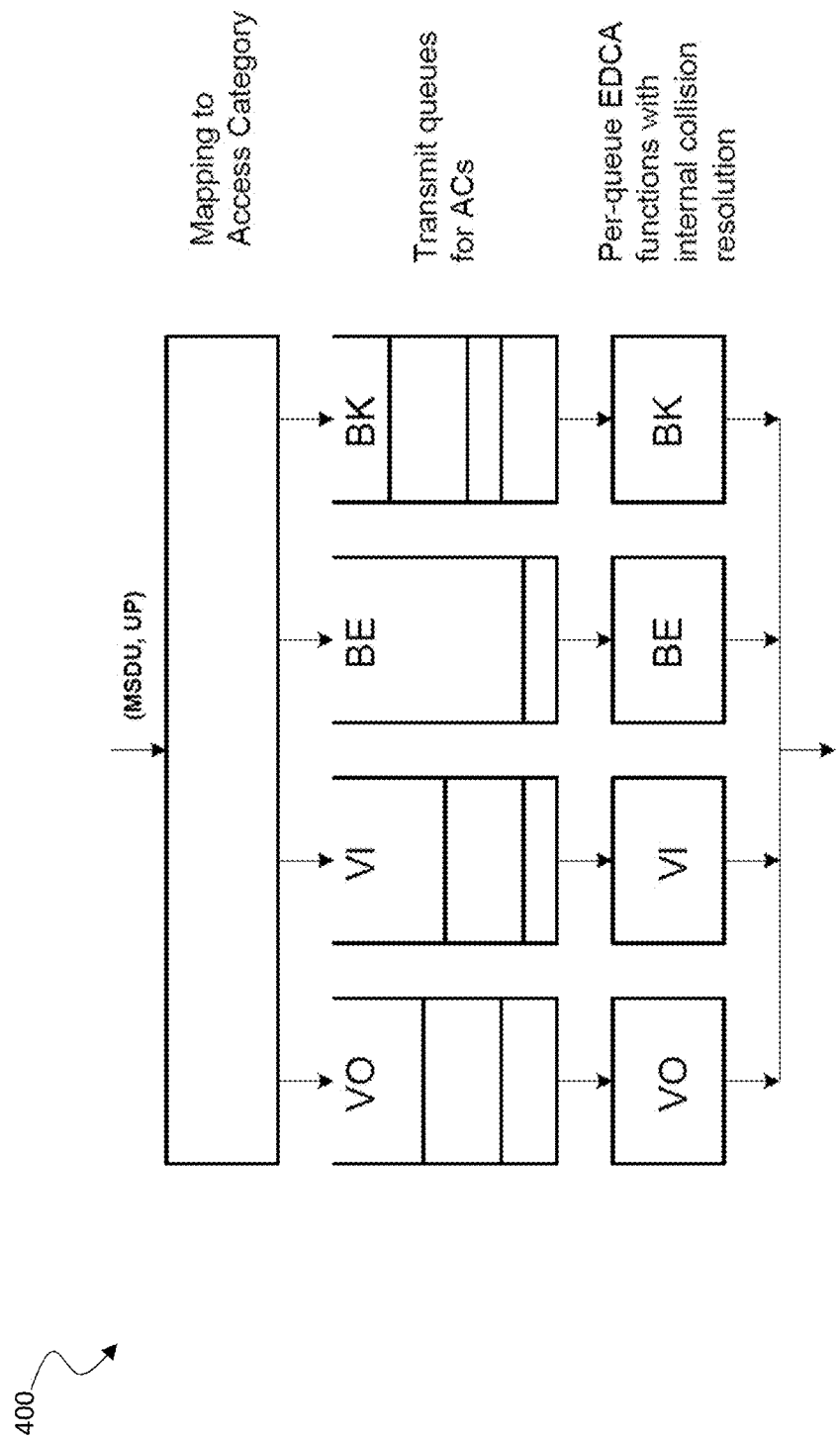
FIG. 4 is a block diagram depicting an exemplary STA frame queue where frames are queued for transmission at the lower MAC layer protocol according to the access categories associated with the frames.

As depicted in exemplary STA queue 400 of FIG. 4, frames (e.g., MAC Service Data Units (MSDUs)) can be queued for transmission at the lower MAC layer protocol according to the access category (AC) associated with the frames. The ACs include voice data (VO), video data (VI), best effort data (BE), and background data (BK). Each AC includes a dedicated transmit queue and an EDCAF capable of internal collision resolution. Frames ready for transmission are queued according to their AC and can be transmitted by synchronizing a TXOP between multiple available interfaces for transmission over multiple wireless links.

Figure 5:
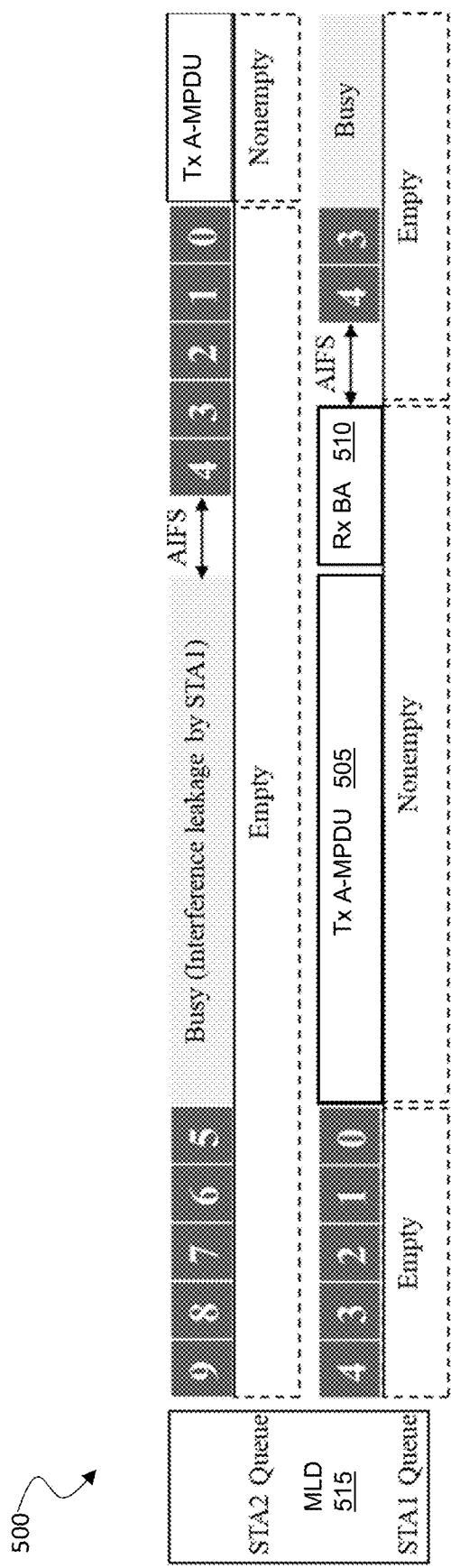
FIG. 5 is an exemplary transmission timing diagram of an exemplary MLD (e.g., multi-link AP or multi-link STA) without synchronizing TXOPs according to embodiments of the present invention.

FIG. 5 depicts an exemplary transmission timing diagram 500 of an exemplary MLD 515 (e.g., multi-link AP or multi-link STA) without synchronizing TXOPs according to embodiments of the present invention. In the example of FIG. 5, MLD 515 checks RBO counter of each STA affiliated with the MLD (e.g., STA1 and STA2). If the RBO counter of a STA is equal to 0, MLD 515 can pass the MPDU from the MLD queue to the STA queue corresponding to the available wireless link. Once queued, the STA can initiate a TXOP for frame exchange sequence. In the example of FIG. 5, the back-off counter of STA1 reaches 0 and an MPDU (e.g., A-MPDU 505) is passed from the MLD queue to STA1 queue. STA1 initiates a TXOP for frame exchange sequence to transmit A-MPDU 505 and to receive block acknowledgment (BA) 510 in response to the transmission. The wireless links of other STAs of MLD 515 (e.g., STA2) are considered busy due to potential IDC caused by the ongoing transmission and/or reception of STA1. In the example of FIG. 5, STA1 and STA2 do not transmit data using synchronous multi-link transmission, which can be enabled according to embodiments of the present invention to improve wireless network performance.

Figure 6:
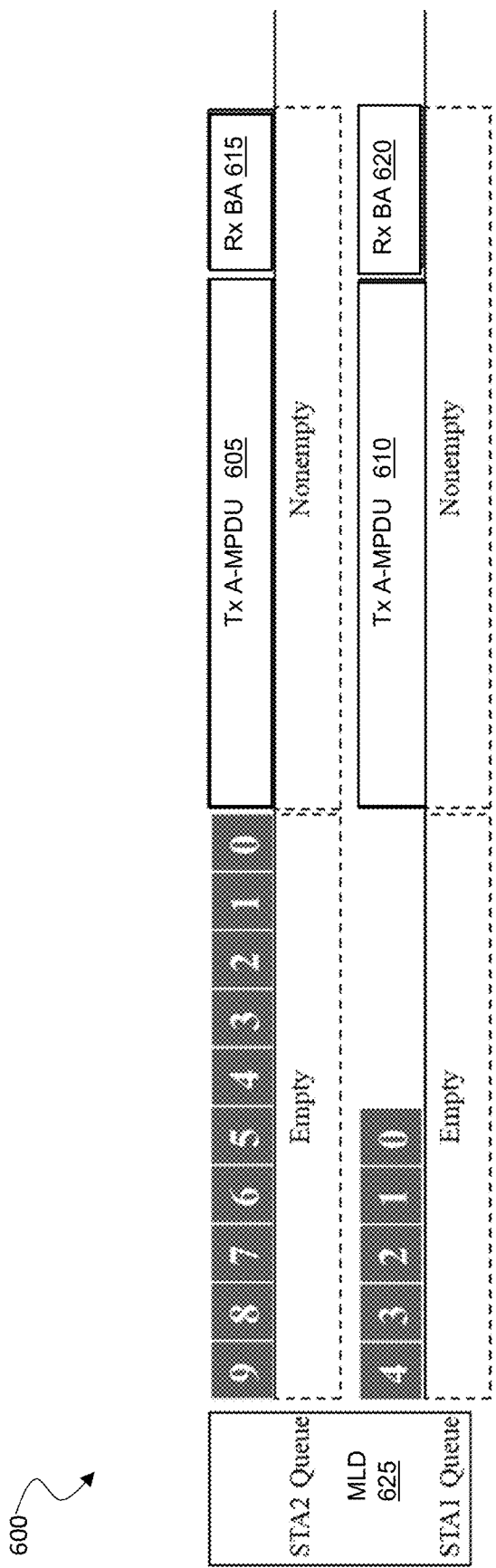
FIG. 6 is an exemplary transmission timing diagram of an exemplary MLD (e.g., multi-link AP or multi-link STA) that synchronizes TXOPs to perform synchronous multi-link transmission according to embodiments of the present invention.

FIG. 6 depicts an exemplary transmission timing diagram 600 of exemplary MLD 625 (e.g., multi-link AP or multi-link STA) that synchronizes TXOPs to perform synchronous multi-link transmission according to embodiments of the present invention. In contrast to the frame exchange sequence depicted in FIG. 5, the frame exchange sequences depicted in FIG. 6 are performed concurrently over multiple links during a synchronous TXOP to improve throughput of the wireless transmission. When the RBO counter of an STA affiliated with the MLD (e.g., STA1) reaches 0, MLD 625 can decide not to pass a queued MPDU from its MLD queue to the STA1 queue when the RBO counter of another affiliated STA (e.g., STA2) has almost reached 0. In this case, STA1 does not yet initiate a TXOP, and STA2 continues its back-off procedure. When the RBO counter of STA2 is equal to 0, the MLD passes an MPDU from the MLD queue to both the STA2 queue and the STA1 queue. At this time, STA1 and STA2 can simultaneously initiate a TXOP. It is appreciated that an STA (e.g., STA1) does not invoke a new back-off procedure if the medium is not busy according the baseline rule. In other words, if a transmit queue become non-empty and the medium is idle, the back-off procedure is not used. In the example of FIG. 6, frame A-MPDUs 605 and 610 are transmitted concurrently by STA1 and STA2 during a synchronous TXOP after both back-off counters reach 0. BAs 615 and 620 are received during the TXOP from the recipient of A-MPDUs 605 and 610. In this way, simultaneous transmission and reception by the MLD is avoided, and the performance and reliability of MLD 625 is substantially improved by transmitting data over multiple wireless links simultaneously.

Figure 7:
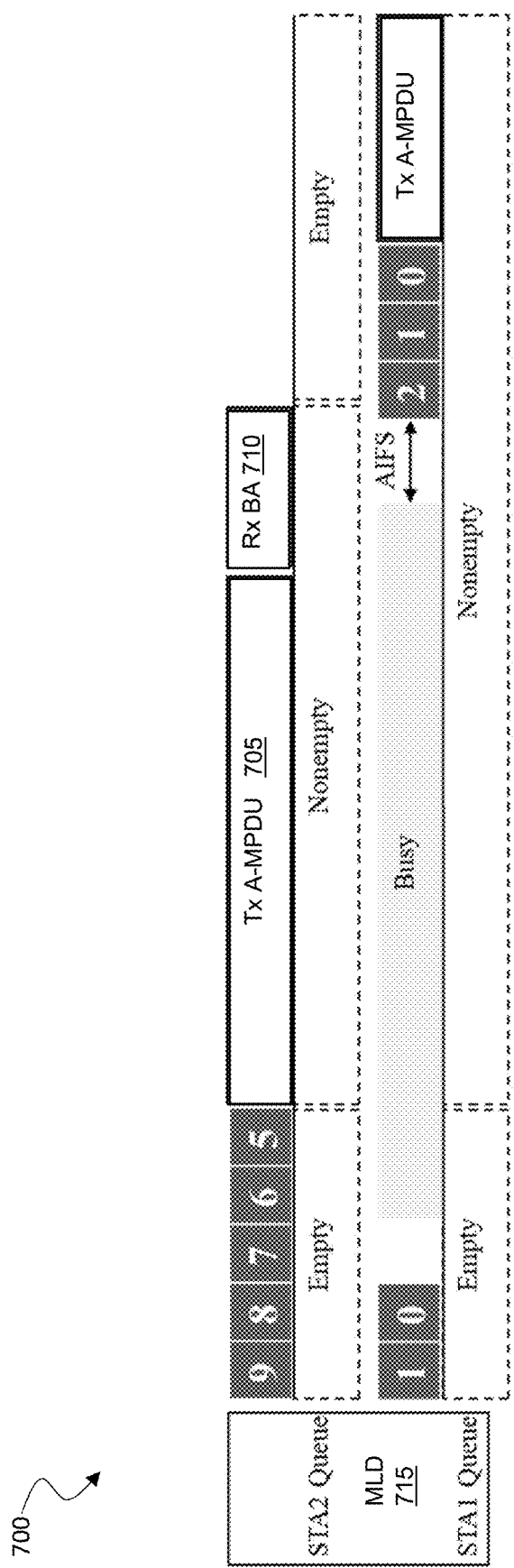
FIG. 7 is an exemplary transmission timing diagram 700 of an exemplary MLD (e.g., multi-link AP or multi-link STA) including a link that is occupied according to embodiments of the present invention.

FIG. 7 depicts an exemplary transmission timing diagram 700 of exemplary MLD 715 (e.g., multi-link AP or multi-link STA) including a transmission link that is occupied during a TXOP according to embodiments of the present invention. In the example of FIG. 7, the wireless medium of STA1 is busy (as determined by physical carrier sense (CS), virtual CS, or TXNAV timer value). In this case, only STA2 initiates a TXOP to transmit A-MPDU 705 and to receive block BA 710. STA1 invokes a new back-off procedure when the medium (the wireless link of STA1) changes to idle (e.g., according the baseline back-off procedure). Alternatively, STA1 can dequeue the MPDU from the STA1 queue to retry synchronous multi-link transmission with STA2 when the wireless medium of STA1 becomes available.

According to some embodiments, a back-off procedure is invoked by an EDCAF when an MA-UNITDATA.request primitive (generated by the LLC sublayer entity) causes a frame associated with that AC (or priority) to be queued for transmission such that one of the transmit queues associated with that AC has become non-empty and any other transmit queues associated with that AC are empty. The wireless medium is determined to be busy on the primary channel according to a physical CS, a virtual CS, or a nonzero TXNAV timer value. If the request can be fulfilled according to the requested parameters, the MAC sublayer entity properly formats a frame and passes it to the lower layers for transfer to a peer MAC sublayer entity or entities.

Timing Requirements for Multi-Link Transmission

When a wireless STA transmits frames on multi-link with different TXVECTOR parameters (e.g., PPDU format, GI, or LTF type), it may difficult to exactly synchronize the starting times and ending times of the transmissions. According to some embodiments, the starting times and ending times of transmissions on multi-links are synchronized within a time period equal to aSIFSTime+aSignalExtension. To meet this requirement, the STA can apply MAC padding, PHY padding, or packet extension (PE), for example. aSignalExtension is equal to 6 µs when operating in the 2.4 GHz band and 0 µs when operating in the 5 GHz or 6 GHz band. aSIFSTime is equal to 10 µs when operating in the 2.4 GHz band and 16 µs when operating in the 5 GHz or 6 GHz band Accordingly, the value of aSIFSTime+aSignalExtension is equal to 16 µs for both the 2.4 GHz band and the 5/6 GHz band.

When the same inter-frame spaces (e.g., SIFS, PIFS, or AIFS) are used on multi-link, if the ending times of the transmissions on multi-link are synchronized within aSIFSTime+aSignalExtension, the starting times of subsequent transmissions are also synchronized within aSIFSTime+aSignalExtension. Therefore, the starting times of the initial frames do not need to be synchronized. The ending times of the transmissions on multi-link are synchronized unless the frames are the first (initial) frames of the TXOP. When a timing error caused by the OFDM symbol misalignment is bounded to less than 16 µs, to synchronize the ending times of transmissions on multiple links within aSIFSTime+aSignalExtension, only MAC Padding (e.g., EOF padding subframe or Padding subfield) may be necessary. No changes to the PHY layer protocol are necessary in this case.

According to some embodiments, transmission and reception are allowed to overlap within a SIFS period when the SIFS timing accuracies of STAs within the multi-link capable device are different (e.g., Different PPDU format, GI, LTF type, etc.). For example, when the SIFS timing accuracies are of the STAs are ±0.4 µs, transmission and reception can overlap according to the 11ax requirement for an HE TB PPDU.

To resolve or prevent SIFS timing accuracy issues, timing accuracy requirements of an STA affiliated with an MLD can be adjusted. For example, the ending times of the transmissions on multi-link can be synchronized within a period of time equal to aSIFSTime+aSignalExtension−TimingErrorMargin based on TimingErrorMargin information received from a peer STA (affiliated with a different device). The TimingErrorMargin indicates that the peer STA can respond to the STA within aSIFSTime+ aSignalExtension±TimingErrorMargin from the end of the soliciting frame.

Figure 8:
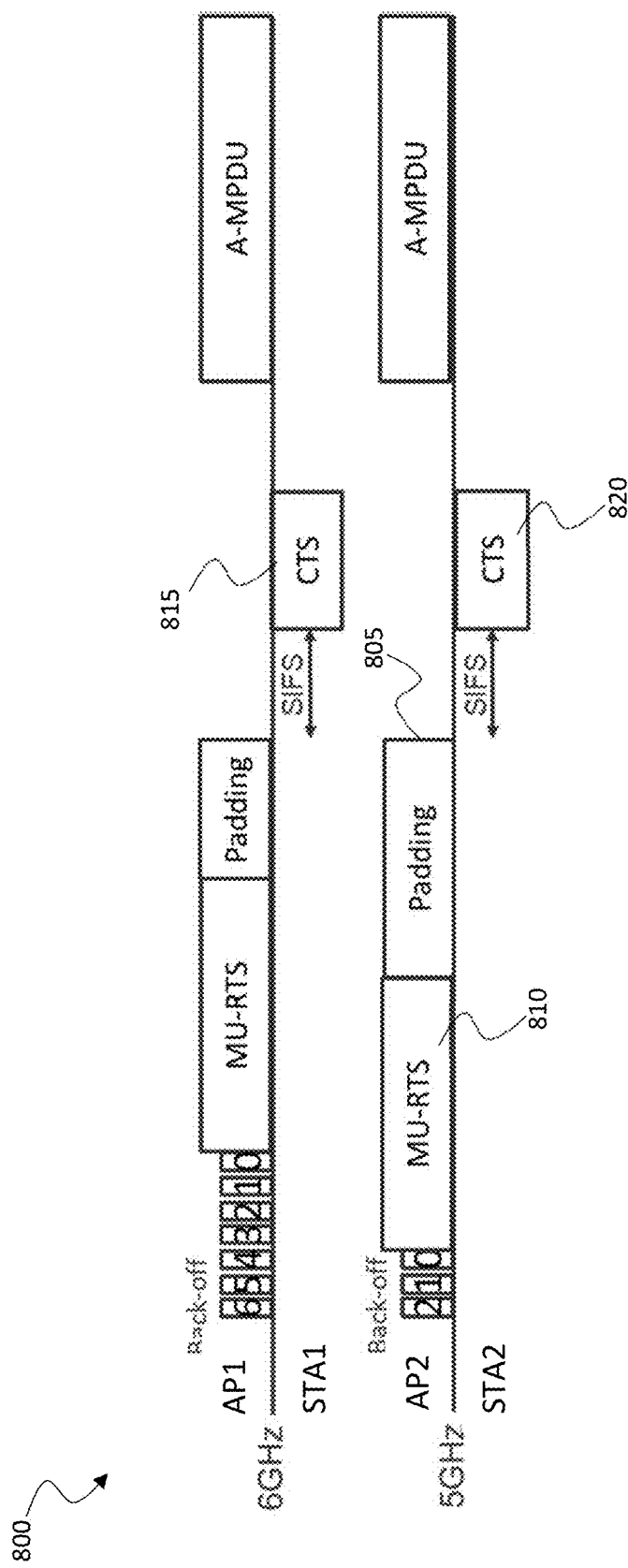
FIG. 8 is an exemplary transmission timing diagram of an MLD for transmitting MU-RTS frames including padding fields used to align CTS frame reception in a wireless network according to embodiments of the present invention.

As depicted in FIG. 8 in exemplary MLD transmission timing diagram 800, MU-RTS frames including padding fields can be used to align CTS frame reception in a wireless network according to embodiments of the present invention. The padding field in the MU-RTS frame is used to delay the associated CTS response until the second MU-RTS frame on another link of the MLD can be sent and received by a peer STA. The length of the padding field in the first MU-RTS frame can be set to an expected channel access latency until the other STA (of the same multi-link device) obtains a TXOP on its link. For example, the expected channel access latency can be set to a value greater than or equal to the minimum of AIFS[AC]+back-off counter (for that AC)*aSlotTime for set of ACs. The expected channel access latency can also be set to be less than a predetermined threshold (locally configured). If an expected channel access latency value that satisfies the above conditions does not exist, the MU-RTS frame can be transmitted without the padding field.

In the example of MLD transmission timing diagram 800 of FIG. 8, padding field 805 of MU-RTS frame 810 is used to align the transmission of CTS frames 815 and 820. The padding value of padding field 805 can be set according to an expected channel access time greater than or equal to the minimum of AIFS[AC]+back-off counter (for that AC)*aSlotTime or according to a predetermined value, for example. In this way, IDC interference caused by overlapping transmission and reception by an MLD is prevented to improve the performance of the wireless network. It is possible that ending times of transmissions on multi-links cannot be synchronized in some cases, such as when a non-HT PPDU is transmitted that does not support any padding mechanism. Therefore, according to some embodiments, only a single wireless link is used for transmission by the MLD to avoid potential IDC interference caused by simultaneous transmission and reception by the MLD when slot boundaries used by STAs of an MLD are not aligned and padding mechanisms are not supported.

Novel Techniques of TXOP Synchronization for Multi-Link Device

Embodiments of the present invention are directed to novel TXOP synchronization methods for MLDs. With regard to FIG. 9, according to some embodiments, each STA of a multi-link device (e.g., STA1 and ST2) performs an independent EDCA channel access on an associated link using its own EDCA parameters (CWmin, CWmax, AIFS, CW, and Retry Counter). When the back-off procedure of each STA is invoked, the respective back-off counter of each STA is set to the common integer value in order to simultaneously obtain TXOPs on the links. After obtaining a TXOP simultaneously on the links, the STA may initiate the transmission of a frame exchange sequence using the links concurrently. In MLD transmission timing diagram 900 of FIG. 9, AP1 transmits data frame 905 (Seq3) in synchronization with AP2 transmitting data frame 910 (Seq1), and transmits data frame 915 (Seq4) in synchronization with AP2 transmitting data frame 920 (Seq2). AP1 and AP2 simultaneously receive BAs 925 and 930 acknowledging the transmitted data frames. In this way, AP1 and AP2 of the MLD are advantageously prevented from transmitting and receiving data at the same time, thereby effectively preventing IDC interference.

Figure 9:
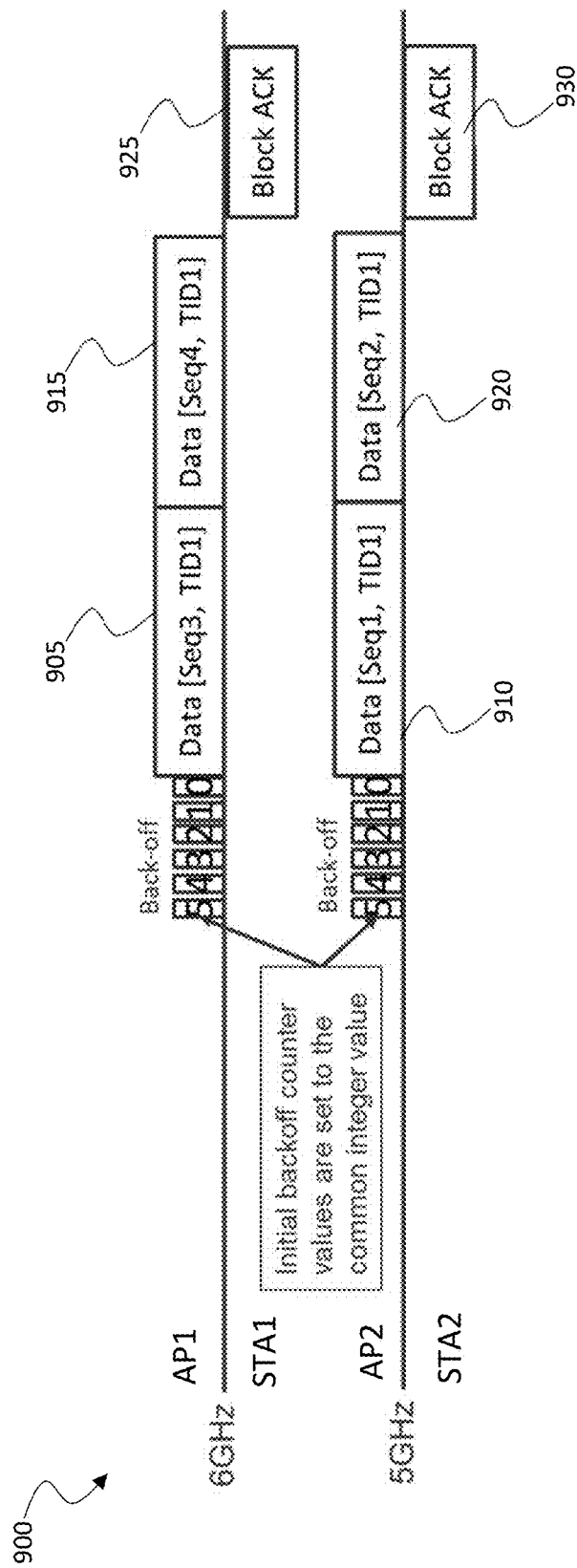
FIG. 9 is an exemplary MLD transmission timing diagram for synchronous TXOP where an STA delays transmission using a back-off timer set according to a common integer value according to embodiments of the present invention.

In the example of FIG. 9, a common integer value for the back-off counter of each STA is determined. Specifically, when the contention window for an access category (CW [AC]) for each STA is the same, the multi-link device chooses an integer value randomly with a uniform distribution taking values in the range 0 to CW[AC] for use as the common integer value. In the example of FIG. 9, the common integer value is 5.

Two configurations are described for use when CW[AC] for each STA is different. In a first configuration, each STA in the multi-link device selects integer values randomly from a uniform distribution of values in the range of 0 to CW[AC] for each STA. The multi-link device selects the largest value of the selected integer values as the common integer value. In a second configuration, the multi-link device chooses an integer value randomly from a uniform distribution of values in the range of 0 to the largest CW[AC] of all STAs to use as the common integer value.

Figure 10:
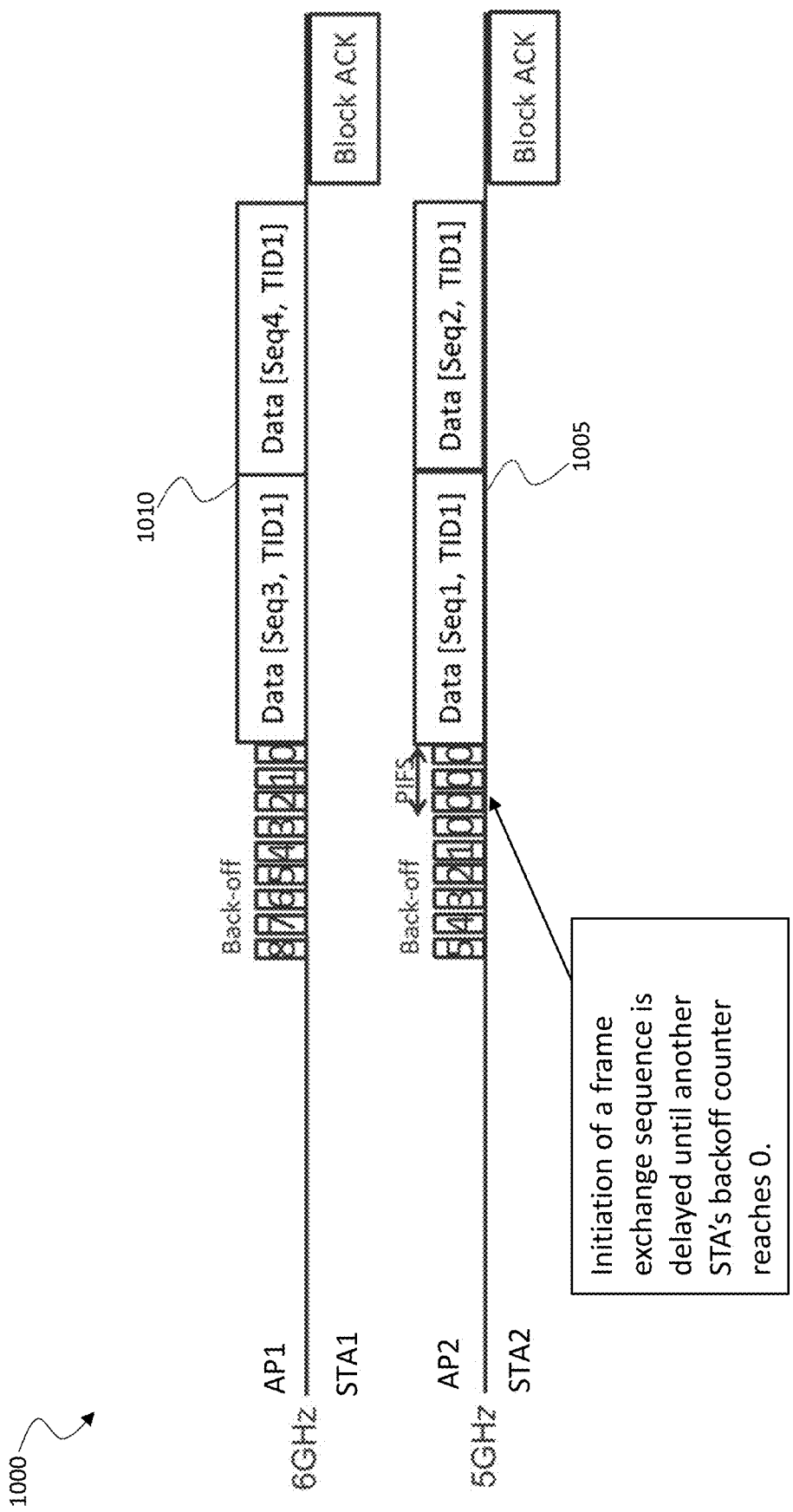
FIG. 10 is an exemplary MLD transmission timing diagram for synchronous TXOP where an STA delays transmission until another STA of the MLD is ready to transmit according to embodiments of the present invention.

FIG. 10 depicts an exemplary MUD transmission timing diagram 1000 of an exemplary synchronous TXOP procedure, where an STA delays transmission until another STA of the MLD is ready to transmit according to embodiments of the present invention. As depicted in FIG. 10, after obtaining a TXOP on one link, if another STA in the same multi-link device still has a non-zero back-off counter, then the STA having a back-off counter that has already reached 0 will delay initiation of a frame exchange sequence until the other STA also obtains the TXOP. In this case, the STA that has delayed initiation of a frame exchange sequence performs physical and virtual CS during the predetermined interval (e.g., PIFS) before initiating a frame exchange sequence to determine if the link has become busy during the delay. In this way, multiple STA can simultaneously use the TXOPs on the multiple links and IDC is avoided.

In the example of FIG. 10, the back-off counter of AP2 reaches 0 before the back-off counter of AP1 reaches 0. Therefore, AP2 delays initiation of frame exchange sequence 1005 until AP1 is also ready to transmit. When the back-off timer of AP1 reaches 0, AP1 and AP2 both receive a TXOP to synchronously initiate frame exchange sequences in a MLO without experiencing IDC (e.g., over the 5 GHz link and the 6 GHz link) as simultaneous transmission and reception by the MLD is advantageously prevented. Frame exchange sequence 1005 and 1010 are performed concurrently over the 5 GHz and 6 GHz wireless links, respectively. According to some embodiments, the delay time is limited according to the EDCA channel access rule. In this case, at each specific slot boundary, the EDCAF may decide to do nothing. Accordingly, the back-off counter may be held at a non-zero value (e.g., a value of 1) for a period of time to reduce the delay time after the back-off counter reaches 0, which may be limited according to the EDCA channel access rule.

Figure 11:
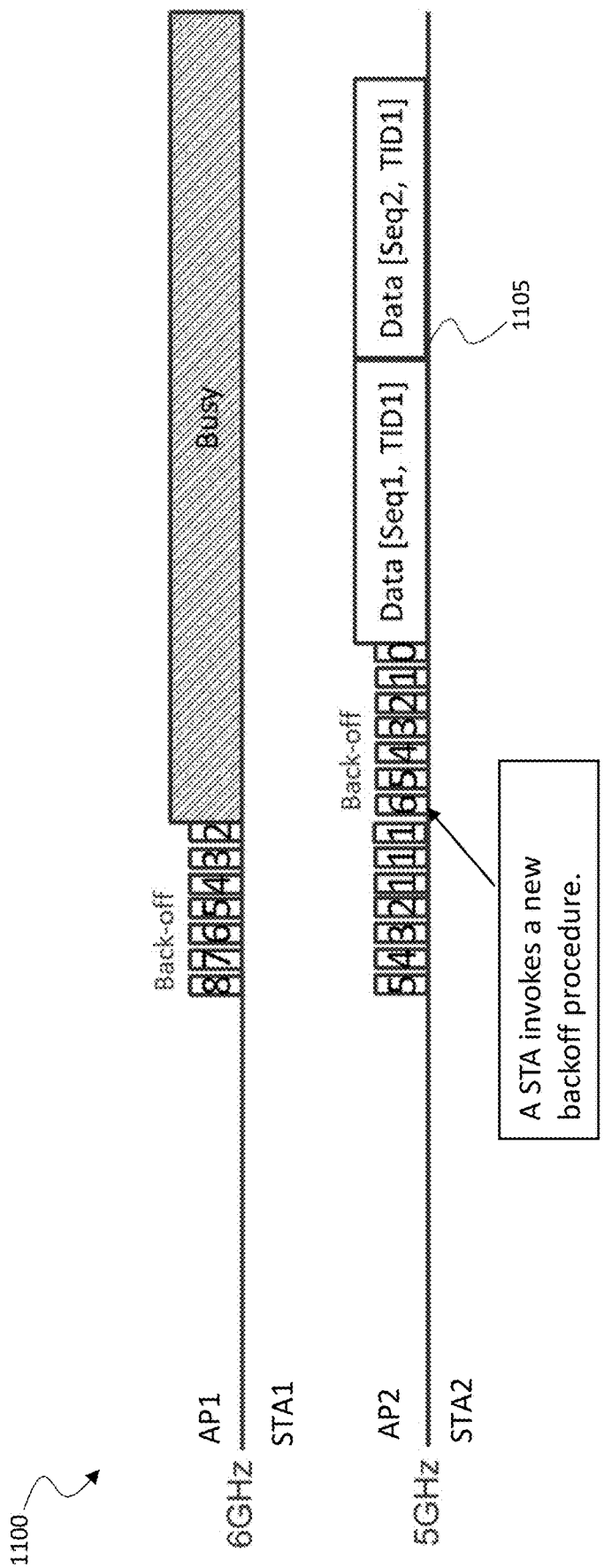
FIG. 11 is an exemplary MLD transmission timing diagram depicting a synchronous TXOP procedure for setting a back-off counter after delaying transmission until another STA of the MLD is ready for transmission according to embodiments of the present invention.

FIG. 11 is an MLD transmission timing diagram depicting an exemplary synchronous TXOP procedure 1100 for setting a back-off counter after delaying transmission until another STA of the MLD is ready for transmission according to embodiments of the present invention. As depicted in FIG. 11, an STA invokes a new back-off procedure when resuming EDCA channel access on a single link after delaying EDCA channel access (e.g., a back-off procedure and an initiation of a frame exchange sequence). For example, the CW[AC] can be reset to CWmin[AC] and the back-off counter can be set to a value chosen randomly with a uniform distribution taking values from the range of 0 to CW[AC]. In the example of FIG. 11, AP2 delays initiation of frame exchange sequence 1105 so that AP1 can be ready for a synchronous MLO. However, the wireless medium of AP1 becomes busy and therefore AP2 invokes a new back-off procedure and transmits frame exchange sequence 1105 over a single link rather than waiting for the wireless medium of AP1 to become available for a MLO. The back-off counter of AP2 is set to a value chosen randomly with a uniform distribution taking values from the range of 0 to CW[AC] (e.g., 6).

According to some embodiments, delaying the EDCA channel access until another STA obtains the TXOP can be enabled only if there is a frame available for transmission at that EDCAF. Otherwise, delaying the EDCA channel access is disallowed to avoid several MLDs delaying EDCA channel access after the back-off procedure.

Novel Slot Boundary Alignment for Synchronous TXOP

According to some embodiments, for specific slot boundaries of a wireless medium, each EDCAF makes a determination to perform one and only one of the following functions according to the rules described below:
 1. Decrement the back-off counter;
 2. Initiate the transmission of a frame exchange sequence;
 3. Invoke the back-off procedure due to an internal collision; or
 4. Do nothing.

At each specific slot boundaries, each EDCAF decrements the back-off counter if the back-off counter for that EDCAF has a nonzero value. Each EDCAF initiates a transmission sequence if there is a frame available for transmission at that EDCAF, the back-off counter for that EDCAF has a value of 0, and initiation of a transmission sequence is not allowed to commence for an EDCAF of higher user priority. Each EDCAF invokes a back-off procedure and reports internal collision if there is a frame available for transmission at that EDCAF, the back-off counter for that EDCAF has a value of 0, and initiation of a transmission sequence is allowed to commence for an EDCAF of higher user priority. Otherwise, the EDCAF does nothing.

In some cases, even when a common back-off counter is used, a multi-link device may be unable to synchronously obtain a TXOP if the slot boundaries of multiple links are not synchronized. According to some embodiments of the present invention, slot boundaries of multiple links used by an MLD are synchronized to obtain a synchronous TXOP for a multi-link operation. This can include delaying transmission of one wireless STA of an MLD to align with the slot boundary of another wireless STA of the MLD, for example.

Figure 12:
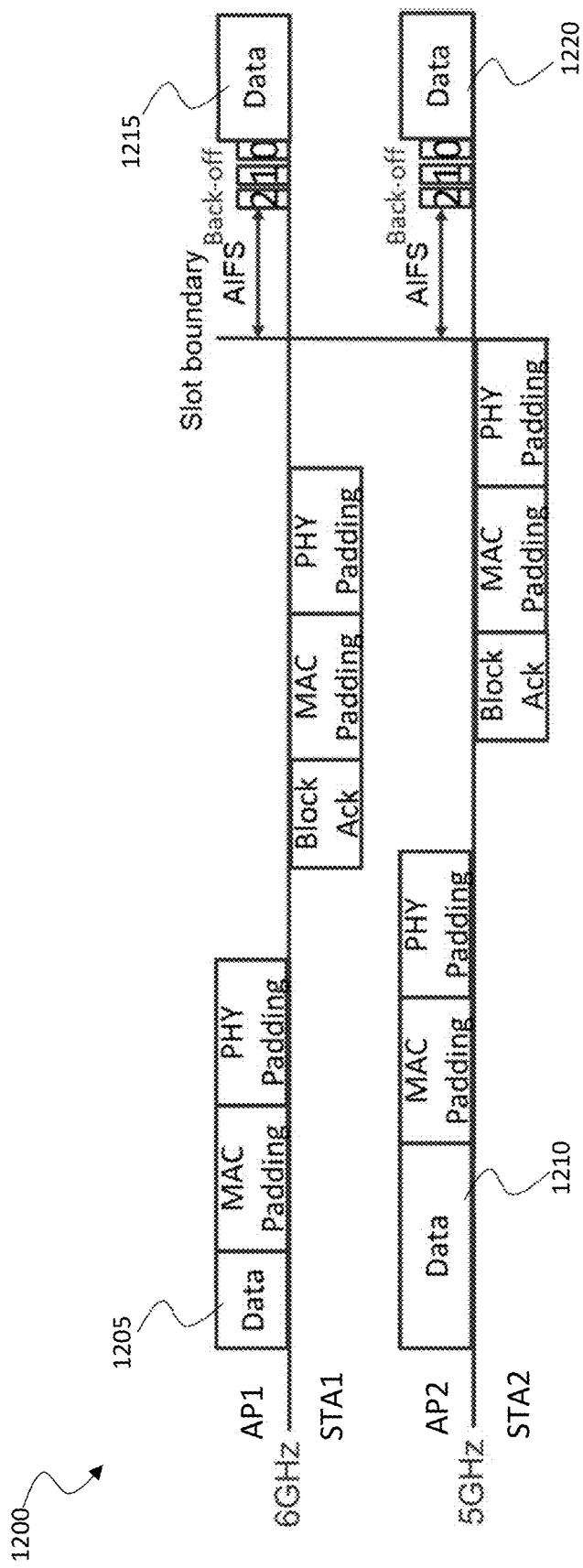
FIG. 12 is an exemplary MLD transmission timing diagram depicting a back-off procedure for respective wireless link of STAs of an MLD that are resumed using the same slot boundary alignment to resolve slot boundary issues according to embodiments of the present invention.

As depicted in exemplary MLD transmission timing diagram 1200 of FIG. 12, according to embodiments of the present invention, a back-off procedure for the respective wireless link of STAs of an MLD can be resumed using the same slot boundary alignment to resolve slot boundary issues. For example, the slot boundary of the STA that most recently accessed the medium can be applied to the STAs of the MLD performing a multi-link operation. In the example of FIG. 12, AP1 transmits data frame 1205 using a first slot alignment and AP2 transmits data frame 1210 using a second slot alignment. For the subsequent transmission, the slot boundary based on the STA that most recently accessed the medium (STA2) is applied to the slot boundary of the other link. After an Arbitration inter-frame spacing (AIFS) period, AP1 and AP2 perform synchronous back-off procedures for frame exchange sequences 1215 and 1220, respectively, using the slot boundary alignment based on the medium access activity from wireless STA2. In this way, the slot alignment issue is resolved and IDC interference is advantageously prevented.

Figure 13:
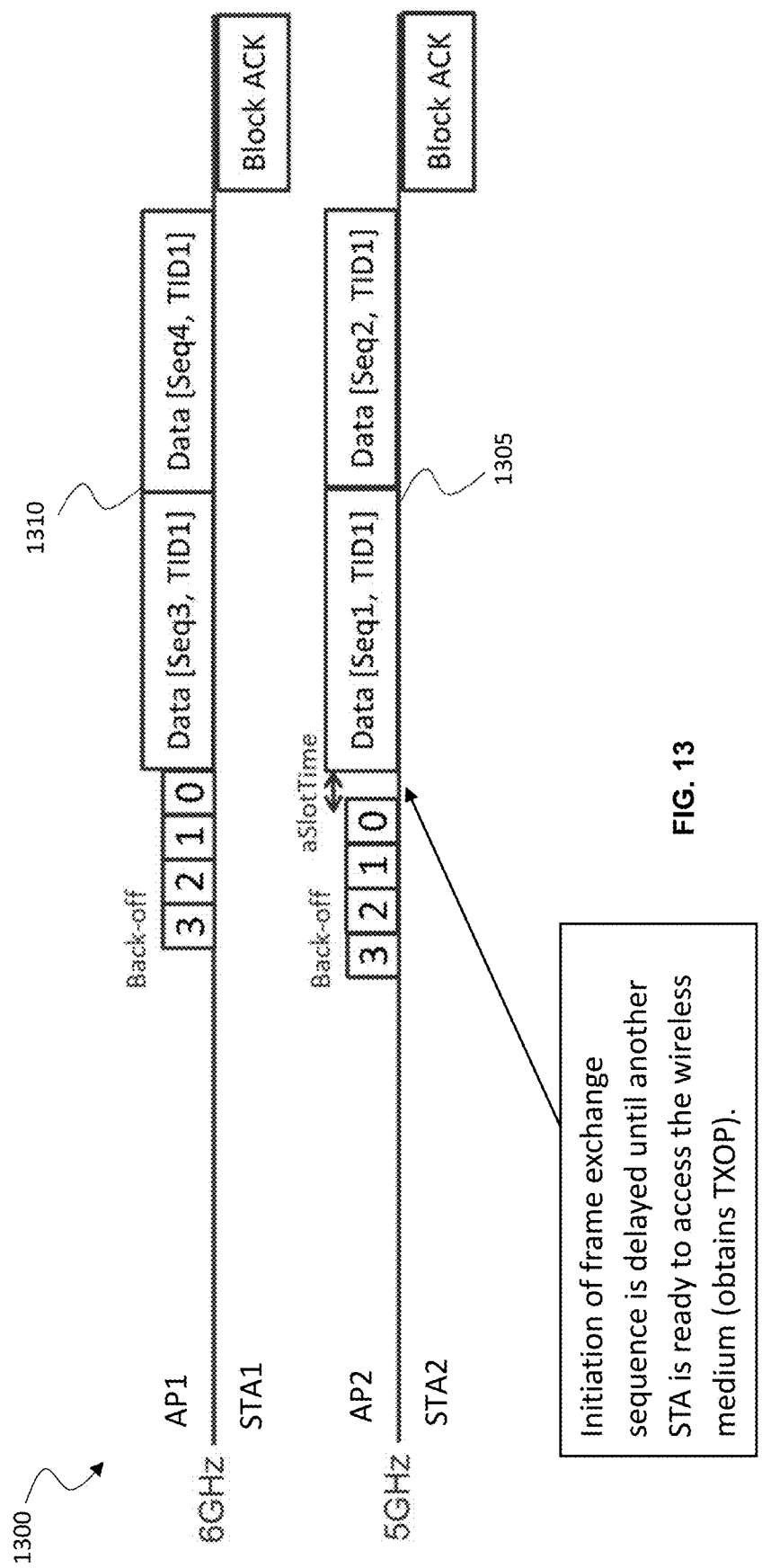
FIG. 13 is an exemplary MLD transmission timing diagram depicting slot boundaries of multiple wireless links of an MLD that are not synchronized, where an STA of the MLD having a back-off counter that has already reached 0 delays initiation of a frame exchange sequence until another STA of the MLD also obtains a TXOP.

With regard to FIG. 13, according to some embodiments, when slot boundaries of multiple wireless links of an MLD are not synchronized, an STA of the MID having a back-off counter that has already reached 0 delays initiation of a frame exchange sequence until another STA of the MLD also obtains a TXOP, as depicted in transmission timing diagram 1300. In this case, the STA that has delayed initiation of the frame exchange sequence performs physical and virtual CS during the aSlotTime before initiating the frame exchange sequence. The upper boundary of the delay time can be set to aSlotTime (e.g., 9 us). In the example of FIG. 13, AP2 has already reached 0 on the back-off counter of the 5 GHz link. AP2 delays initiation of data transmission 1305 for a maximum time of aSlotTime. AP2 performs physical and virtual CS during aSlotTime before initiating frame exchange sequence 1310. In this way, the slot boundaries of the AP1 and AP2 are aligned and IDC interference between the 5 GHz and 6 GHz wireless links is prevented while performing an MLO.

Figure 14:
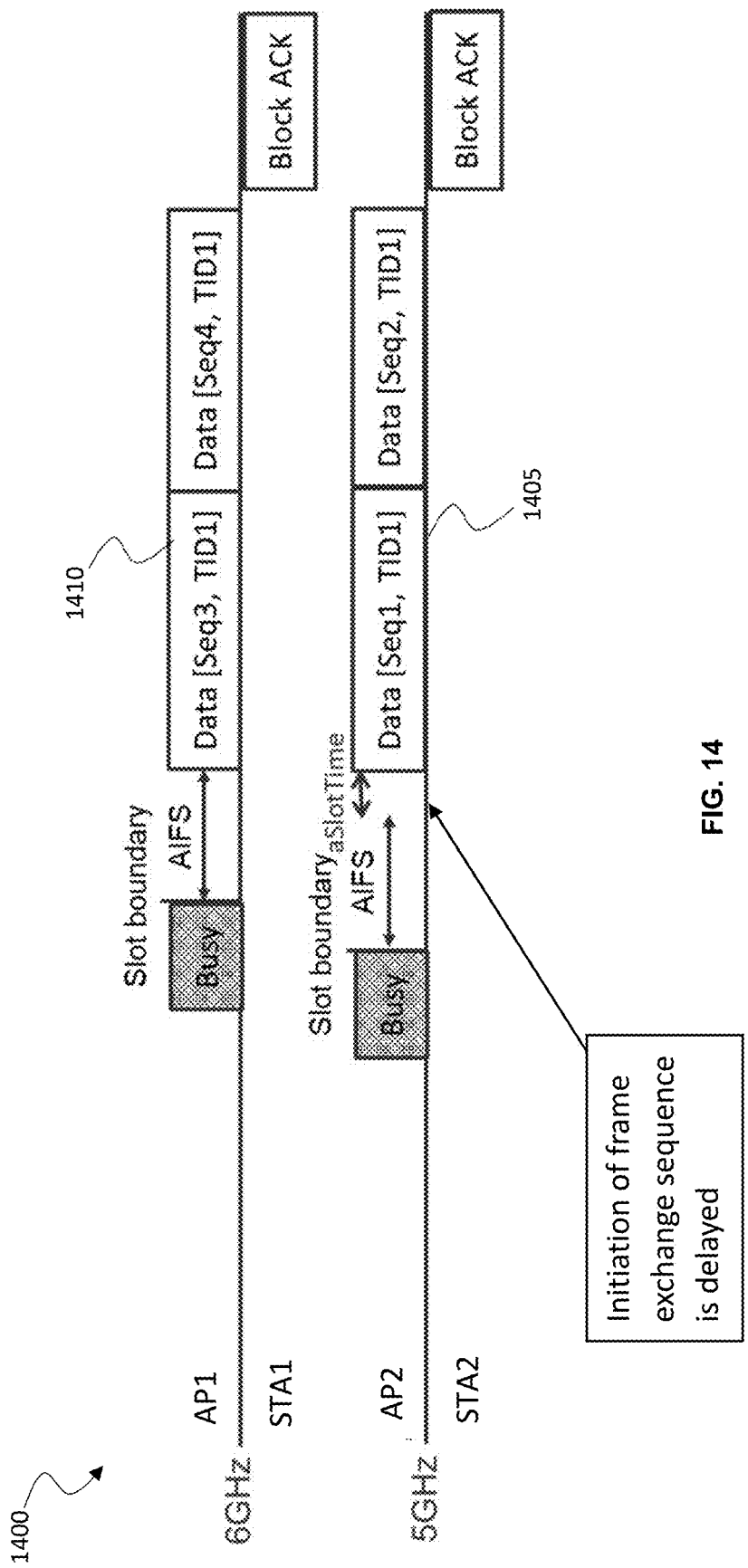
FIG. 14 is an exemplary MLD transmission timing diagram depicting unaligned slot boundaries according to embodiments of the present invention, where an STA of the MLD delays initiation of its frame exchange sequence to bring its slot boundary alignment in-line with the other STA.

With regard to FIG. 14, according to embodiments of the present invention, when STAs of the same MLD can immediately access the wireless medium after PIFS or AIFS, but the slot boundaries of the STAs are not synchronized, an STA of the MUD can delay initiation of its frame exchange sequence to bring its slot boundary alignment in-line with the other STA, as depicted in transmission timing diagram 1400. The STA that has delayed an initiation of a frame exchange sequence performs physical and virtual CS during the aSlotTime before starting an initiation of a frame exchange sequence. In the example of FIGS. 14, AP1 and AP2 are both available to transmit over unoccupied 5 GHz and 6 GHz wireless links. AP2 delays initiation of data transmission 1405 on the 5 GHz link (for a maximum time of aSlotTime) to synchronize the slot time alignment of AP2 with the slot time alignment of AP1. AP2 performs physical and virtual CS during aSlotTime before initiating frame exchange sequence 1405 concurrently with frame exchange sequence 1410 initiated by AP1 in a synchronous TXOP. In this way, the slot boundaries of the AP1 and AP2 are aligned and a MLO can be performed over the 5 GHz and 6 GHz wireless links and IDC interference between the 5 GHz and 6 GHz wireless links is prevented.

Exemplary Process for TXOP Synchronization in a Multi-Link Device

Figure 15:
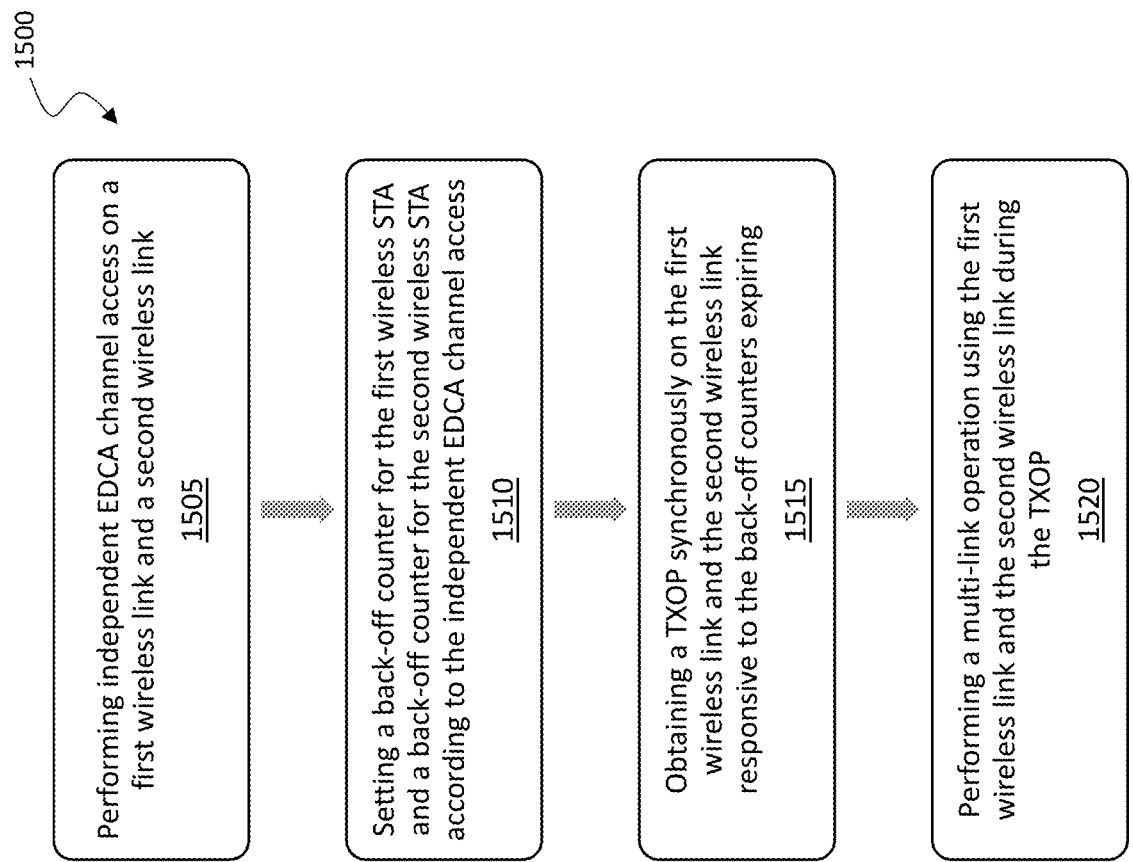
FIG. 15 is a flowchart of an exemplary computer-implemented process for automatically synchronizing TXOPs for an MLD to improve wireless network performance and prevent IDC according to embodiments of the present invention.

With regard to FIG. 15, an exemplary computer-implemented process 1500 for automatically synchronizing TXOPs for an MLD to improve wireless network performance and prevent IDC interference is depicted according to embodiments of the present invention. Process 1500 can be performed by a multi-link device performing a multi-link operation, and the multi-link device can act as a wireless access point or a wireless station. The MLD includes a first wireless station (STA) associated with a first wireless link and a second wireless STA associated with a second wireless link. The MLD can include more wireless STAs for communicating over different wireless links.

At step 1505, independent EDCA channel access is performed on a first wireless link and a second wireless link.

At step 1510, a back-off counter is set for the first wireless STA and a back-off counter is set for the second wireless STA according to the independent EDCA channel access.

At step 1515, a TXOP is obtained on the first wireless link and in synchronization with obtaining a TXOP over the second wireless link responsive to the back-off counters expiring.

At step 1520, a multi-link operation is performed using the first wireless link and the second wireless link during the TXOPs.

The multi-link operation performed in step 1520 during the TXOP can include adding padding or otherwise delaying transmission over on the wireless links to synchronize the transmissions. For example, padding can be added to an MU-RTS to align the ending times of frames and synchronize reception of CTS frames transmitted in response to the MU-RTS frames. In some embodiments, back-off counters for initiating transmissions over the first wireless link and the second wireless link are set according to a common integer value. According to other embodiments, the multi-link operation includes aligning slot times of the first wireless STA and the second wireless STA. These steps align (synchronize) the TXOPs of the first wireless STA and second wireless STA to prevent IDC and improve wireless network performance.

Exemplary Computer Controlled System

Figure 16:
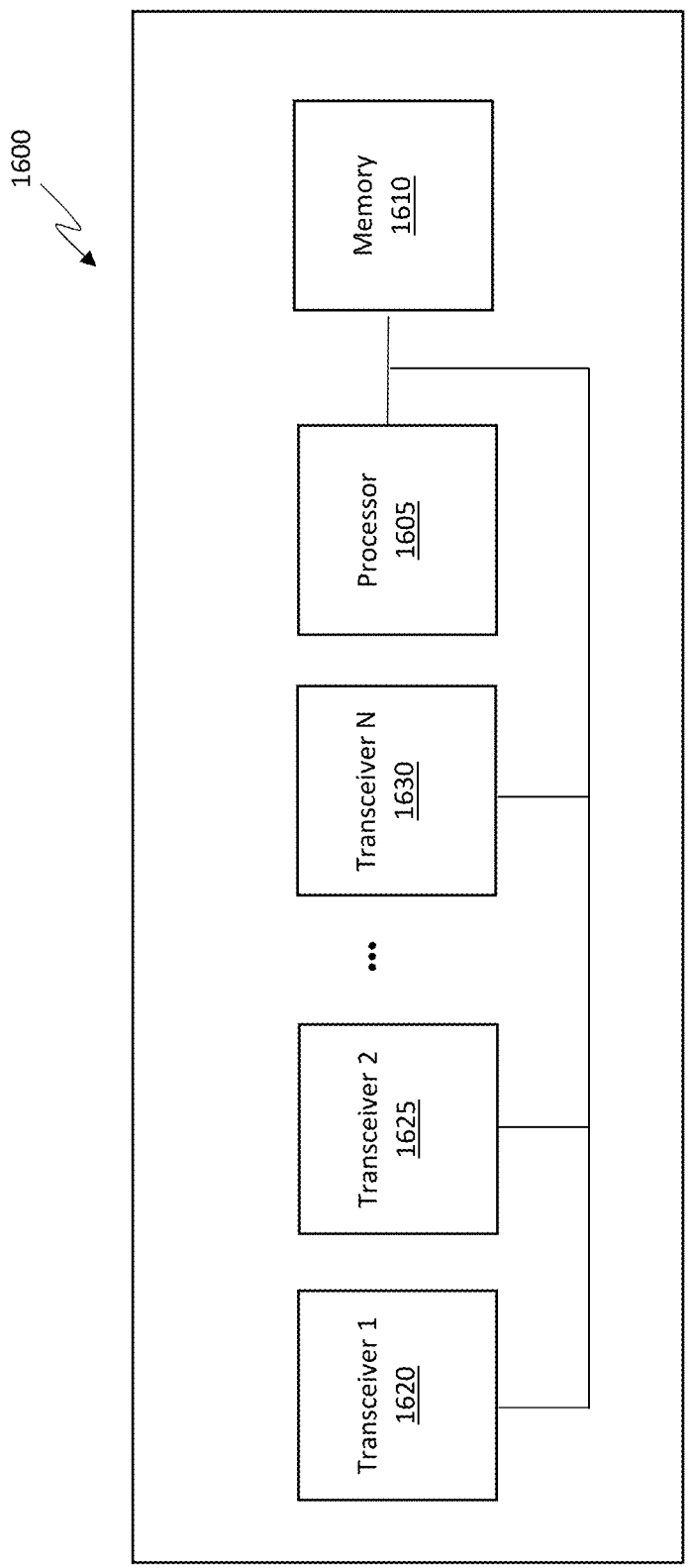
FIG. 16 is a block diagram depicting an exemplary computer system platform upon which embodiments of the present invention may be implemented.

FIG. 16 depicts an exemplary wireless device 1600 upon which embodiments of the present invention can be implemented. Embodiments of the present invention are drawn to multi-link devices capable of performing a multi-link operation. The multi-link device can act as a wireless access point or a wireless station. An exemplary MLD includes a first wireless station (STA) associated with a first wireless link and a second wireless STA associated with a second wireless link. The MLD can include more wireless STAs for communicating over different wireless links to further improve network performance. A multi-link operation performed by the wireless device during a synchronous TXOP can include adding padding or otherwise delaying transmission over on the wireless links to synchronize transmission over multiple-wireless links.

The wireless device 1600 includes a processor 1605 for running software applications and optionally an operating system. Memory 1610 can include read-only memory and/or random access memory, for example, to store applications and data for use by the processor 1605 and data received or transmitted by transceivers 1620, 1625, and 1630. The wireless device 1600 can include fewer or more transceivers according to some embodiments. The transceivers 1620, 1625, 1630 communicate with other electronic devices over a wireless network (e.g., WLAN) and typically operates according to IEEE standards (e.g., IEEE 802.11ax, IEEE 802.11ay, IEEE 802.11be, etc.).

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data over a wireless network by a multi-link device (MLD), the method comprising:
performing independent enhanced distributed channel access (EDCA) channel access at the multi-link device on a first wireless link and on a second wireless link, wherein the multi-link device comprises:
a first wireless station (STA) associated with the first wireless link; and
a second wireless STA associated with the second wireless link;
determining that a back-off counter of the first wireless link has reached 0;
obtaining a TXOP on the first wireless link;
determining that the second wireless STA has not yet obtained a TXOP on the second wireless link;
delaying a frame exchange sequence over the first wireless link until a back-off counter of the second wireless link has reached 0;
determining that the back-off counter of the second wireless link has reached 0;
responsive to determining that the back-off counter of the second wireless link has reached 0, obtaining a TXOP on the second wireless link;
responsive to the obtaining a TXOP on the second wireless link, performing a multi-link operation at the multi-link device using the first wireless link and the second wireless link when physical carrier sensing and virtual carrier sensing indicate that the first wireless link is idle;
initiating the frame exchange sequence over the first wireless link during the TXOP on the first wireless link; and
initiating a frame exchange sequence over the second wireless link during the TXOP on the second wireless link.

2. The method as described in claim 1, further comprising:
receiving timing accuracy information from a second multi-link device indicating that the second multi-link device can respond within a period of time equal to aSIFSTime+aSignalExtension±TimingErrorMargin measured from the end of a transmission of a soliciting frame, and
wherein the multi-link device performs the multi-link operation in coordination with said second multi-link device.

3. The method as described in claim 1, wherein the multi-link operation comprises:
transmitting a first multi-user request to send (MU-RTS) frame using the first wireless STA over the first wireless link; and
transmitting a second MU-RTS frame using the second wireless STA over the second wireless link.

4. The method as described in claim 3, wherein the first MU-RTS frame comprises padding that aligns an ending time of the first MU-RTS frame with an ending time of the second MU-RTS frame.

5. The method as described in claim 3, wherein the first MU-RTS frame comprises padding that aligns reception of a first clear to send (CTS) frame with reception of a second CTS frame, and wherein the first CTS frame and the second CTS frame are transmitted responsive to the first MU-RTS frame and second MU-RTS frame, respectively.

6. The method as described in claim 5, wherein the padding is within a padding field that aligns a TXOP of the first wireless link with a TXOP of the second wireless link.

7. The method as described in claim 1, further comprising configuring a slot alignment of the first wireless STA to match a slot alignment of the second wireless STA.

8. A multi-link device for transmitting data over a wireless network, the multi-link device comprising:
a first wireless station (STA) associated with a first wireless link of the wireless network;
a second wireless STA associated with a second wireless link of the wireless network;
a memory for storing data; and a processor operable to:
perform independent enhanced distributed channel access (EDCA) channel access on the first wireless link and the second wireless link;
determine that a back-off counter of the first wireless link has reached 0;
obtain a TXOP on the first wireless link;
determine that the second wireless STA has not yet obtained a TXOP on the second wireless link;
delay a frame exchange sequence over the first wireless link until a back-off counter of the second wireless link has reached 0;
determine that the back-off counter of the second wireless link has reached 0; and
responsive to determining that the back-off counter of the second wireless link has reached 0, obtain a TXOP on the second wireless link;
responsive to the obtaining a TXOP on the second wireless link, perform a multi-link operation using first wireless STA over the first wireless link and the second wireless STA over the second wireless link when physical carrier sensing and virtual carrier sensing indicate that the first wireless link is idle;
initiate the frame exchange sequence over the first wireless link during the TXOP on the first wireless link; and
initiate a frame exchange sequence over the second wireless link during the TXOP on the second wireless link.

9. The multi-link device as described in claim 8, wherein the processor is further operable to:
receiving timing accuracy information from a second multi-link device indicating that the second multi-link device can respond within a period of time equal to aSIFSTime+aSignalExtension±TimingErrorMargin measured from the end of a transmission of a soliciting frame, and
wherein the multi-link device performs the multi-link operation in coordination with said second multi-link device.

10. The multi-link device as described in claim 8, wherein the multi-link operation comprises:
transmitting a first multi-user request to send (MU-RTS) frame over the first wireless link; and
transmitting a second MU-RTS frame over the second wireless link.

11. The multi-link device as described in claim 10, wherein the first MU-RTS frame comprises padding that aligns an ending time of the first MU-RTS frame with an ending time of the second MU-RTS frame.

12. The multi-link device as described in claim 10, wherein the first MU-RTS frame comprises a padding field set according to an expected channel access latency of the second wireless STA.

13. A method of transmitting data over a wireless network by a multi-link device (MLD), the method comprising:
performing independent enhanced distributed channel access (EDCA) channel access at the multi-link device on a first wireless link and on a second wireless link, wherein the multi-link device comprises:
a first wireless station (STA) associated with the first wireless link; and
a second wireless STA associated with the second wireless link;
obtaining a transmission opportunity (TXOP) on the first wireless link;
performing physical carrier sensing and virtual carrier sensing on the first wireless link during an aSlotTime;
delaying channel access to the first wireless link until the second wireless STA has obtained an TXOP on the second wireless link to align slot boundaries for performing a multi-link operation on the first wireless link and the second wireless link; and
performing the multi-link operation at the multi-link device using the first wireless link and the second wireless link during the TXOP on the first wireless link and the TXOP on the second wireless link when physical carrier sensing and virtual carrier sensing indicate that the first wireless link is idle.

* * * * *